United States Patent Office 2,932,080
Patented Apr. 12, 1960

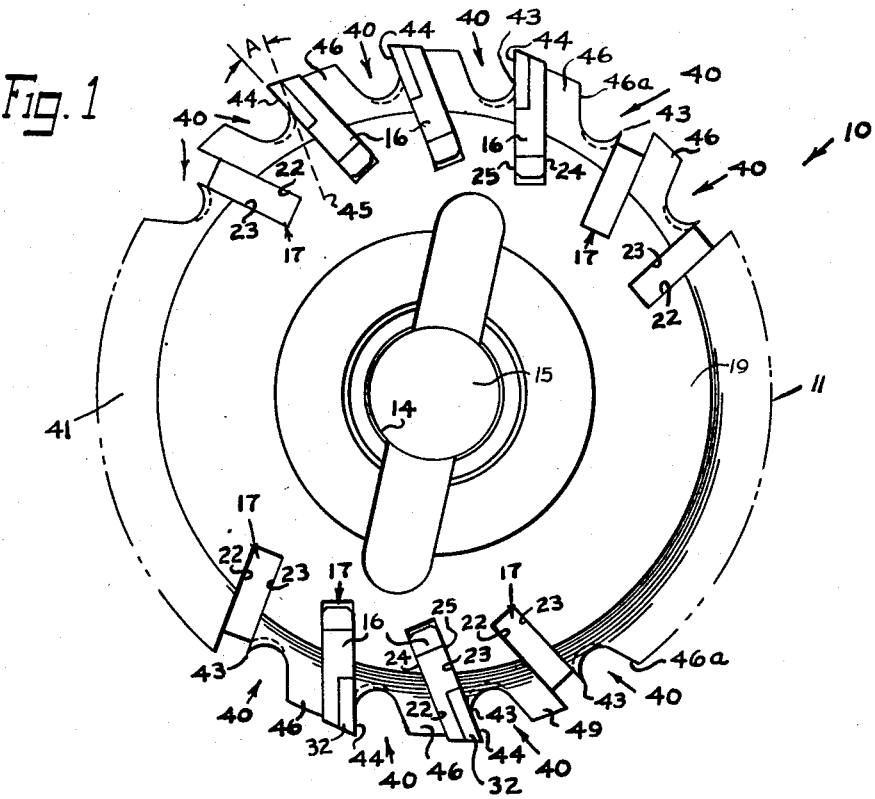
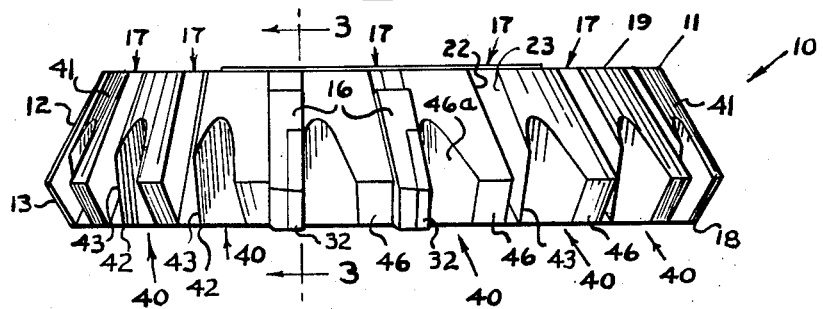

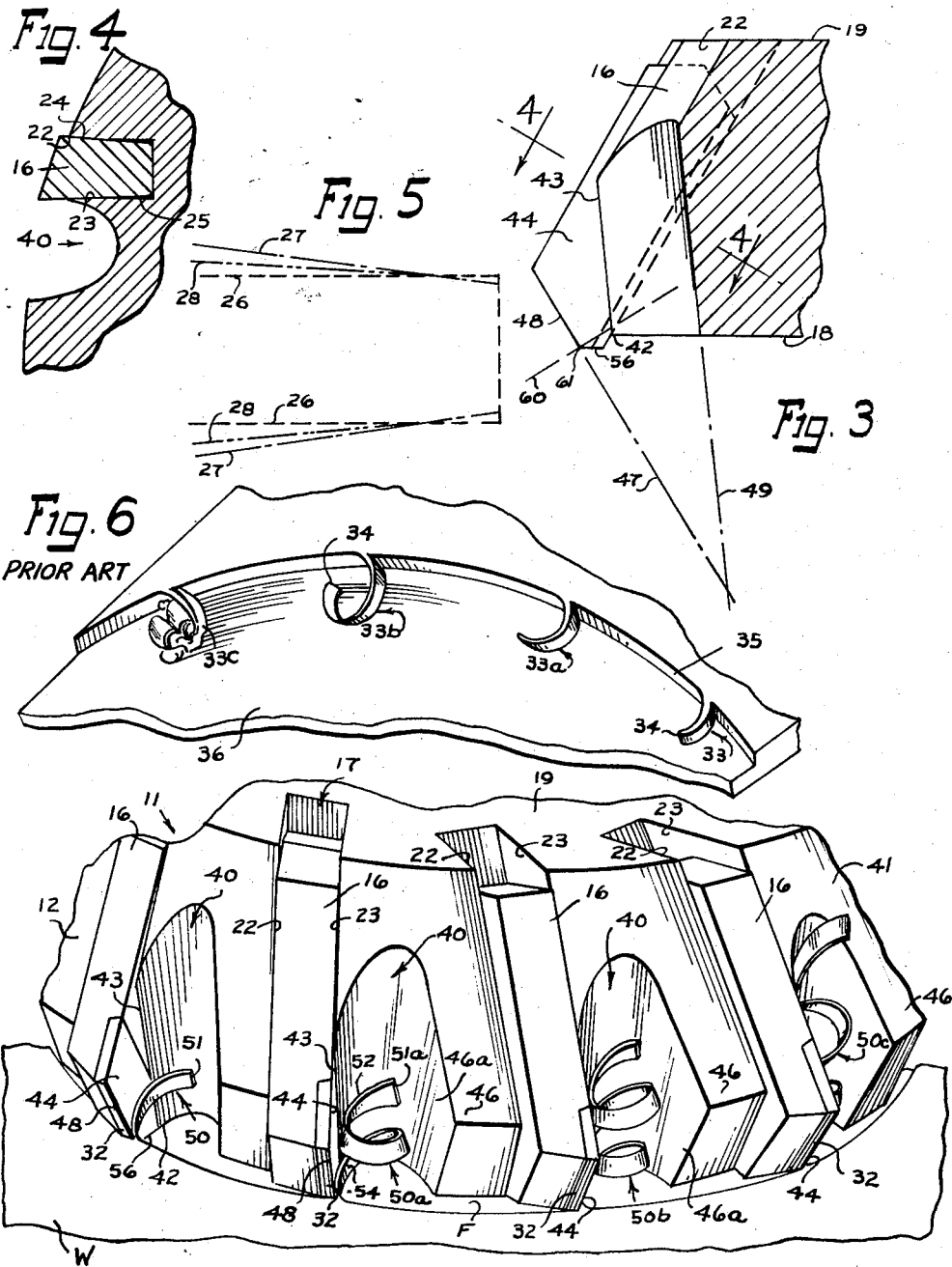

2,932,080

INSERTED TOOTH CUTTER

Alfred O. Schmidt, Elm Grove, and Joseph R. Roubik, Milwaukee, Wis., assignors to Kearney & Trecker Corporation, West Allis, Wis., a corporation of Wisconsin Application May 22, 1957, Serial No. 660,903

7 Claims. (Cl. 29—105)

This invention relates to cutting tools for machine tools and more particularly to an improved milling cutter of the inserted blade type.

A general object of this invention is to provide an improved cutter body construction.

Another object of the invention is to provide an improved inserted tooth milling cutter especially adapted for operating at high speeds on material having considerable tensile strength.

Another object of the invention is to provide an improved milling cutter having simplified means for receiving and holding cutting teeth therein.

Still another object of the invention is to provide an improved milling cutter having means for forming the chips, produced by action of the teeth, in a helical configuration.

Yet another object of the invention is to provide a milling cutter capable of forming chips in a helix or spiral and operable to direct the chips away from the finished surface of a workpiece.

Another object of the invention is to provide an improved milling cutter having individual chip flutes for each cutting tooth therein which flutes open to the back face of the cutter body.

Another object of the invention is to provide an improved milling cutter having a frusto-conical body and individual chip flutes for each cutting tooth therein which flutes terminate at the peripheral surface of the cutter body.

Another object of the invention is to provide an improved inserted tooth milling cutter having a frusto-conical body and provided with chip flutes which are disposed adjacent to individual cutting teeth and arranged in a manner so that the cutting tooth face of the individual teeth cooperates to form a portion of the wall of the associated chip flute.

Still another object of the invention is to provide an improved inserted tooth milling cutter having chip flutes associated with the individual cutting teeth which function to form the chip produced by an associated cutting tooth in the form of a helix and operate to direct the moving chip upwardly away from the finished surface of the workpiece towards the back of the cutter where the chip by centrifugal force is moved clear of the cutter.

The foregoing and other objects and advantages of this invention will become more apparent from the following specification and may be achieved by the cutting tool described in connection with the accompanying drawing illustrating the invention in which:

Figure 1 is a plan view showing a cutter incorporating the principles of the invention;

Fig. 2 is an elevational view of the cutter shown in Fig. 1;

Fig. 3 is an enlarged fragmentary view in vertical section of a chip flute showing a cutting blade in the cutter body taken along the plane represented by the line 3—3 in Fig. 2;

Fig. 4 is an enlarged fragmentary view of the cutter showing the method of maintaining a cutting blade within the cutter body taken along the plane represented by the line 4—4 in Fig. 3;

Fig. 5 is a diagrammatic outline of a slot and blade, showing the resulting mutual boundary line upon insertion of the blade within the slot;

Fig. 6 is a fragmentary view of a workpiece, showing several stages in the formation of a chip produced without the benefit of the forming and guiding means of the present invention, the chip having a natural tendency to curl toward the finished surface of the workpiece; and, Fig. 7 is a fragmentary perspective view of the improved cutter operating upon a workpiece and showing the chips being directed away from the finished surface of the workpiece in the form of a helical or spiral configuration.

Referring more specifically to the drawings, the illustrated rotary inserted blade cutter 10 embodying the invention comprises a body 11 having an upper frusto-conical portion 12 and a lower frusto-conical portion 13. The bases of the two frusto-conical portions 12 and 13 being arranged in base-to-base relationship, as shown in Figs. 2 and 7. The cutter body 11 is provided with an axial opening 14 for receiving a spindle 15 of a machine tool for a driving connection thereto, in a well known manner. The cutter body 11 is provided with a plurality of cutting blades 16 disposed in equally spaced apart machined slots, generally indicated by the reference numeral 17. The slots 17 extend from a front face 18 of the cutter 10 to a back face 19 thereof and are inclined inwardly toward the axis of rotation of the cutter.

As best illustrated in Fig. 4, the machined slots 17 have parallel side walls 22 and 23 while the sides 24 and 25 of the cutting blades 16 are provided with a slight taper. The construction of the blades is such that the dimension of the bottom or base thereof is slightly less than the width dimension of the slot, while the top of the blade has a width dimension which is greater than the width dimension of the slot, this being the preferred construction. However, the base dimension of the blade may be equal to the slot dimension. With this construction, an adequate interference fit of the blade within the slot may be obtained to prevent movement of the blade relative to the slot. In this respect, a blade having a taper not to exceed .005 of an inch per inch with a top width dimension in a range of .002 to .003 of an inch greater than the width dimension of the slot, has been found to be ideal to provide a satisfactory interference fit of the blade within the slot.

As shown in Fig. 5, the outline of the slot is represented by the dotted line 26, while the blade is represented by the dot and dash line 27. As is apparent, the base of the blade which is of lesser dimension than the width of the slot, facilitates insertion of the blade within the slot. As the blade is driven inwardly into the slot, the greater width dimension of the blade, toward its outer end, relative to the width dimension of the slot, compresses the walls of the slot to expand the width of the slot and also effects compression of the blade to reduce its width. Thus, the mutual boundary line between them is shifted, as indicated by the dash double dot line 28 and does not coincide with the original width of either the blade or slot. With the shifting of the mutual boundary line, large compressive stresses exist and are accompanied by frictional forces sufficiently large to retain the blade 16 in place against all movement tending to be induced during a cutting operation. As can be seen in Fig. 5, the frictional force which now exists between the blade and the slot is effective over at least two-thirds of the blade depth which is adequate for maintaining the blade in position during a cutting operation.

The improved inserted tooth cutter as set forth herein, is contrary to the teachings of the prior art. The prior art teaches the necessity of employing serrated mating face structure for blade and slot, or the use of separate wedges to maintain the blade in place, or the necessity of using a locking device to accomplish this result, or a combination of these features. It is therefore apparent that with the present invention an improved inserted tooth cutter has been provided that requires no adjustment of mating parts, nor cumbersome locking devices, and is appreciably less costly to produce.

It has been found that an angle of 30° from the vertical plane is a satisfactory angle for the slots to be inclined inwardly. At this angle the blades 16 extend beyond the peripheral surface of the lower frusto-conical portion 13 of the body 11 sufficiently so that the desired angle characteristics may be ground on a cutting portion 32 of the blades 16.

The control of chip disposal or chip flow, especially in high speed milling of materials having considerable tensile strength, has always been a problem. The direction of chip flow often has to be altered or changed, either to clear the cutting edge of the blade or to clear the finished surface of the workpieces or both. For the purpose of illustrating the problem confronting workers in the cutter art, reference is made to Fig. 6, wherein a series of theoretical chips in various stages of formation are illustrated. The chips as illustrated in Fig. 6, are shown with their natural curl tendencies as they would be formed by a cutter without the benefit of auxiliary chip guiding or forming structure. For the purposes of description, the chips shown in Fig. 6, will be considered as various growth stages of a single chip. On the right side of Fig. 6, the chip 33 is seen as it first appears upon the initial contact of a cutter blade with the surface of the workpiece.

The chip 33, as it first appears, has its free end portion 34 inclined upwardly and exhibits the natural curl tendency. The upward inclination of the end 34 is imparted to the chip by the action of the blade operating upon the transient surface 35 of the workpiece. At 33a the chip has grown to a length which is sufficient to allow the natural tendency of the chip to assert itself and it can be seen that the chip is curling in a downwardly direction toward the finished surface 36 of the workpiece. At the stages 33 and 33a the chip presents no particular problem, as it does not as yet interfere either with the cutting edge of the blade nor with the finished surface 36 of the workpiece. At 33b the chip appears grown to an extent wherein the free end portion 34 is in contact with the finished surface 36 of the workpiece. Upon contacting the finished surface 36 the end portion 34 mars the finished surface, as indicated, with a resulting unsatisfactory surface quality. At 33c the chip has grown to the extent that the chip is in full contact with the finished surface of the workpiece and due to the force of the cutter has been mashed into a formless mat, which severely damages the finished surface on the workpiece and interferes with the proper functioning of the cutter.

The chip in the stages 33b and 33c upon contacting the finished surface 36 of the workpiece will be work hardened due to the lower edge impinging upon the workpiece surface and being forced against it by the cutting blades of the revolving cutter and will effect a continual marring of the finished surface. The work hardened lower edge of the chip not only badly mars the finished surface of the workpiece but, also, interferes with the action of the cutting blade.

Rotary milling cutters have been previously designed with cutter blades and their associated cutting edges located in such a manner as to direct the chips away from the machined surface. However, in order to achieve this result it is necessary to orient the cutter blades so that a positive axial rake angle exists in conjunction with a negative radial rake angle. With this arrangement of the cutter blades the initial impact with the workpiece occurs at the corner of the cutting edge which can result in a rapid break down of the cutting edge especially if the cutter is tipped with a cemented carbide.

The manner of entry of the cutting edge into the workpiece may be improved by orienting the cutter blades so that the initial impact with the workpiece occurs at an intermediate point along the cutting edge removed from its corner. However, the objections to such orientation of the cutter blades lies in the fact that the chips formed by the cutter may be directed downwardly toward the finished surface in the path of the rapidly moving cutting blades which engage the chips and move them along the machined surface while forcing them into the surface to mar the finish. This objection is avoided in the present invention by a unique flute arrangement co-operating with each of the cutting blades and which overcomes the tendency of the chips to move downwardly and guides them into a path of travel away from the machined surface. As a result, the novel flute arrangement prevents the chips from marring the finished surface even though the cutter blades may be arranged to initiate a downward movement of the chips that are being formed from the workpiece.

To this end, the cutter 10 is provided with a plurality of polished chip flutes, generally indicated by the reference numeral 40. Each chip flute 40 is associated with an individual cutter blade 16, as shown. The chip flute 40 is a cylindrically formed recess which is open at the front face 18 of the cutter 10. The chip flute 40 extends upwardly from the front face 18 to the peripheral surface 41 of the upper frusto-conical portion 12 of the cutter body 11, as illustrated in Figs. 2 and 7 to provide a clear path for the upward movement of the chip toward the back face of the cutter. The curved surface of the chip flute 40 intersects the front bottom of the slot 17, as at 42, and flows into the cutting face 44 of the blade 16 to form a substantially continuous surface therewith for receiving the chip severed from the workpiece and guiding it from the finished surface. The arrangement is such that the curve formed by the intersection of a chip flute with the front face 18 of the cutter body intersect at the point 42 which is the juncture point of the side wall 23 of the slot 17 and the base of the slot and the front face 18 of the cutter body.

To this purpose, reference is made to Fig. 1, where the relationship between a blade and its associated chip flute is illustrated. As there shown, the cutting face or front face 44 of the blade 16 intersects the radius of its associated chip flute in a manner that an angle formed by the cutting face 44 and a plane tangent to the chip flute, represented by the dash line 45, at the intersection point is an included angle "A." We prefer to have this relationship be such that the included angle "A" will be substantially 30°. With the relationship between the blade and the chip being such as to provide for an included angle of 30° the most desirable surface relationship between the face 44 of the blade 16 and the curved surface of the chip flute 40 is provided to lead a chip into the chip flute. However, while we prefer that the included angle "A" be 30° the relationship between the face 44 of the blade 16 and the curved surface of the chip flute 40 may be varied to an extent that the included angle "A" may be in a range of 15° to 45°.

The radius of the flute is maintained constant throughout the length of the flute so that a line of intersection 43 with the slot 17 is disposed parallel to the axis of the flute. It is therefore apparent that the cutting face 44 of the blade 16 and the curved surface of the flute form a continuous guide surface for a chip produced by the blade. A surface 46a of the flute constitutes the back face or wall of the back supporting portion 46 of the cutting blade and is tangent to the curved surface of the flute in a manner to insure that crowding of the chip within the flute will not occur. To insure proper support for the back of the blades 16, we prefer that the back supporting portion 46 have a width dimension which is at least equal to the width dimension of the slots 17. With this construction, it has been found that adequate support is provided to prevent the blades 16 from bending or flexing when engaged in a workpiece in a cutting operation.

The desired diameter of the chip flute is one that exceeds the natural curl diameter of the chips. Thus, for any given cutter size, the surface of the chip flute and the front face of the cutter intersect along a curve whose minimum radius of curvature is dictated by the range of cutter application varying from a minimum established experimentally to a maximum not to be exceeded unless it is permissible to reduce the number of blades in a cutter of given diameter. It has been found that the minimum radius of the chip flutes should not be less than one-quarter of an inch nor greater than one-half of the minimum allowable spacing between the front face of a blade and the back face of the back support of the next adjacent blade. Experimental tests have shown that chip flutes having a radius of five-sixteenths of an inch are generally satisfactory for most purposes.

Experimental tests have shown that for most cutting purposes it is completely satisfactory to maintain the axes of the chip flutes at an angle of 85° to the front face 18 of the cutter inclined toward the axis of the cutter. However, this angle of 85° for the axes of the flutes may vary as desired so long as the relationship between the cutting edge of the blade and the center line of the chip flute satisfy the condition that a trace line of the cutting edge of the blade and a trace line of the center line of the chip flute which when projected into a plane perpendicular to the front face of the cutter and containing the center line of the cutter body will form an angle opening upwardly away from the front face of the cutting body. As viewed in Fig. 3, the trace line 47 of the cutting edge 48 of the blade 16 and a trace line 49 of the axis of the flute are projected into a plane that passes through the center line of the cutter body and is perpendicular to the front face 18 of the cutter body 11 and as can be seen the angle therebetween is one which opens upwardly, thus, satisfying the conditions established in the preceding statement.

As shown in Fig. 3, the blades 16 are disposed within the slots 22 in a manner that they extend outwardly from the front face 18 of the cutter body. The distance that the blades 16 extend beyond the front face 18 is one that will insure that an imaginary line, represented by the broken line 60 in Fig. 3, passing through the blade point 61 and which is also perpendicular to the cutting edge 48 of the blade will pass above the intersecting point 42 of the chip flute surface with the blade slot and front face 18 of the cutter body. The positioning of the blades within the slots in this manner will insure smooth entry of the chips produced by a blade on to the curved surface of the flute regardless of the depth of cut that the cutter is required to make. Therefore, if the angle of the cutting edge 48 is increased or decreased, the distance that the blade will extend beyond the front face 18 of the cutter body must also be increased or decreased accordingly. Thus, chips produced by the cutting blade 16 will flow in a direction substantially normal to the cutting edge 48 and the chip will enter on to the curved surface of the chip flute 40 to be formed into helices or spirals guided upwardly away from the front face 18 of the cutter body. On the other hand, should the imaginary line, as represented by the broken line 60 in Fig. 3, pass below the juncture point 42 a chip moving in a direction normal to the cutting edge 48 of the blade 16 will have its lower edge, that is the edge nearest the workpiece, contacting the finished surface of the workpiece immediately upon being formed. When the lower edge of the chip contacts the finished surface of the workpiece the surface will be marred. Also, when the lower edge of the chip contacts the workpiece the chip will tend to flatten or mat and the blade will override the chip. Thus, the chip will interfere with the proper cutting function of the blade and often results in the blade chipping or even breaking. Thus, when the chip is prevented from entering on to the curved surface of the chip flute the beneficial action of the flute to form and guide the chip away from the workpiece is defeated.

As the rotating cutter 10 operates upon a workpiece W the chips produced by the cutting blades are formed into helices or spirals which are directed upwardly by the configuration of the flute so that they are guided away from the cutting area and the finished surface "F," as best shown in Fig. 7. As there shown, the several chips depicted are produced by the several cutting blades, however, for the purpose of explanation, the several chips will be considered as a single chip in its progressive stages of development. The chip as produced by the blade 16 upon entry into the work appears as indicated at 50 with the free end portion 51 thereof, having a shape similar to the shape of the chip 33 in Fig. 6. The chip indicated at 50 follows the cutting face 44 of the blade 16 along a path generally perpendicular to the cutting edge 48 of the blade to the line of intersection 43 where the cutting face of the blade merges into the curved surface of the chip flute 40.

The end 51 of the chip as it engages the curved surface of the flute 40 is forced to follow along the surface upwardly or away from the finished surface "F" of the workpiece W. This direction being imparted to the chip by reason of the upwardly opening angle formed by the cutting edge of the blade 16 and the axis of the flute 40, as shown in Fig. 3. By comparing the chip indicated at 50 in Fig. 7 with the chip 33a in Fig. 6, which chips are in substantially the same growth stage, the beneficial control that the cutter 10 exerts upon the chips during a cutting operation is quite apparent. In the example of the chip 33a of Fig. 6, it is already apparent that the chip will engage the finished surface of the workpiece with a resulting impairment to the surface quality thereof. On the other hand, the chip, indicated at 50 in Fig. 7, shows the spiral directed definitely upwardly, away from the finished surface "F" of the workpiece, to insure an unmarked surface. It can be clearly seen that the chip indicated at 50, not only is directed away from the finished surface but is also directed away from the secondary or finishing cutting edge 56 which produces the finished surface.

As the chip develops, as indicated at 50a in Fig. 7, the upwardly directed helical or spiral formation of the chip has been established as it follows along the contour of the flute 40.

The first formed portion 52 of the chip, indicated at 50a, is always further above or further away from the finished surface of the workpiece than the later formed portion 54 of the chip. As the chip is developed, the end portion 51a of the portion 52 of the chip 50a is again in contact with the upper portion of the flute 40 while the later formed portion 54 of the chip is guided by the curved surface of the flute where the succeeding loop of the helix or spiral is formed. The end 51a of the chip, shown at 50a, is in substantially the same state of guided contact with the chip flute 40 as is the end 51 of the chip shown at 50. It is therefore apparent, by comparing the chip in the stages, as indicated at 50 and 50a of Fig. 7, that the upwardly directed helical or spiral formation of the chip is accomplished by the action of the chip flute 40 and is supported by it in the upright position. Further growth of the chip, as indicated at 50b and 50c in Fig. 7, is progressively upward in a helical or spiral formation. The chip then is directed away from the cutting zone and finished surface of the workpiece so that no opportunity for clogging in the chip flute or damage to the finished surface is possible.

It is therefore apparent that an improved cutter has been provided which is capable of directing chips away from the finished surface of a workpiece so that the possibility of interference or marring is eliminated. It is also apparent that the improved cutter is operative to control the direction of travel of the chips without the usual sole reliance on cutter blade inclination. The improved cutter functions to control the direction of the chips regardless of the cutting blade inclination and cutting edge angle. It is therefore possible to select the appropriate cutter blade angles without the necessity of compromising them to secure proper chip disposal. It is, also, apparent that the novel construction and arrangement of the chip flutes in extending from the front face of the cutter towards its back face transverse to the front face through an entire section of the cutter provides an uninterrupted passage for the chips in a direct path away from the workpiece. Thus, the chips are directed upwardly away from the workpiece toward the back face of the cutter in a direct path and not out the side of the cutter as done by cutters in the prior art. The chip flutes in directing the chips upwardly away from the workpiece toward the back face of the cutter enable the operator to have full and clear vision of the work progress and insures that long stringy chips will not be drawn back into the path of the cutter to interfere with efficient operation of the cutter. Also, with the present chip flute arrangement directing the chips upwardly away from the workpiece toward the back face of the cutter in a direct path rather than curving the chips out the side of the cutter eliminates any possibility of the chips jamming in the chip flutes and clogging the cutter.

Although the illustrative embodiment of the invention has been described in considerable detail for the purpose of disclosing a practical operative structure whereby the invention may be practiced advantageously, it should be understood that the individual features of the invention may be included in other structural forms without departing from the spirit and scope of the invention, as set forth in the subjoined claims.

The principles of this invention having now been fully explained in connection with the foregoing description, we hereby claim as our invention:

1. A rotary cutter for machine tools comprising a cutter body having a frusto-conical upper portion and a frusto-conical lower portion arranged in base-to-base relationship, said cutter body having a plurality of equally spaced cutter blade receiving slots, a plurality of curved chip flutes in said cutter body with each flute being disposed adjacent to one of the slots, the slots being formed in said cutter body so that the bases of the slots are inclined inwardly at an angle of substantially 60° relative to the front face plane of said cutter body and in a manner that the intersections of the bases of the slots with the front face of said cutter body are at a greater radial distance from the axis of the cutter than the intersections of the bases of the slots with the back face of said cutter body are from the axis of the cutter, the slots also having their side walls arranged parallel to each other, a plurality of cutting blades having tapered bodies inserted in the slots in a manner to establish an interference fit therebetween, the arrangement being such that the edge of the curved surface of each of said chip flutes adjacent to its associated cutter blade intersects the front face of the cutter at the same point that an edge of the base of the slot intersects the front face of the cutter, the axes of each of the chip flutes being disposed at an angle of at least 15° relative to the primary cutting edge of its associated cutting blade, whereby chips produced by said blades are formed in helices or spirals and are directed by the chip flutes away from the finished surface of the workpiece toward the back face of the cutter.

2. In an inserted blade rotary cutter for machine tools, comprising a body having a plurality of blade receiving slots, said slots extending from the front face of said body to the back face thereof and inclined from the front face to the back face inwardly at an angle of approximately 30° toward the axis of rotation of the cutter, said slots having the walls thereof disposed in parallel planes, a plurality of cutting blades inserted within said slots, said blades being constructed so as to have a taper not to exceed .005 of an inch per inch with a bottom width dimension of a range of slightly less than the width dimension of the slots to a width dimension equal to the width dimension of the slots and a top width dimension of a range of .002 to .003 of an inch greater than the width dimension of the slots, whereby upon insertion of said blades within the slots the walls of the slots are compressed to expand their spacing and said blades are compressed to reduce their width and thereby establish an interference fit of said blades within the slots to maintain said blades in position therein.

3. A rotary cutter for machine tools comprising a substantially circular body having a plurality of circumferentially spaced blade receiving slots interrupting the peripheral surface and front face of said body one side of which is defined by a front face of a back support for the cutter blade, a cutter blade disposed in each of said slots having portions extending beyond the peripheral and face surfaces of said body, a chip flute disposed substantially parallel to and contiguous with each of said slots, said flutes interrupting both the peripheral and face surfaces of said body and presenting a curved surface, said flutes and adjacent slots being so positioned that a portion of said curved surface of said flute is disposed substantially in tangential relationship with the face of said cutter blade within said adjacent slot and extends therefrom to the back face of the back support of the preceding blade, the radius of said curved surface being not greater than one-half of the spacing between the front face of a blade and the back face of the back support of the preceding blade, a principal cutting edge on each of said blades disposed at a uniform preselected angle with respect to the plane of the face of said body, the axis of the curved surface being disposed at a greater preselected uniform angle with respect to the plane of the face of said body toward the axis of said body than that of said cutting edges, said principal cutting edges of said blades serving to direct chips removed from a workpiece in a path substantially normal to said cutting edges of said blades and into pressure contact with said curved surfaces of said adjacent flutes, and the difference in the angular relationship between the said cutting edges of said blades and the said curved surfaces of said adjacent flutes serve to guide the chips into a helical path of travel away from the surface of the workpiece.

4. A rotary cutter for machine tools comprising a substantially circular body having a plurality of circumferentially spaced blade receiving slots interrupting the peripheral surface and front face of said body, a cutter blade disposed in each of said slots having portions extending beyond the peripheral and face surfaces of said body, a chip flute disposed substantially parallel to and contiguous with each of said slots, said flutes interrupting both the peripheral and face surfaces of said body and presenting a curved surface having its axis extending upwardly from the plane of the front face of said body to form a guide surface for directing the path of travel of chips, said flutes and adjacent slots being so positioned that a portion of said curved surface of said flute is disposed substantially in tangential relationship with the face of said cutter blade within said adjacent slot, a principal cutting edge on each of said blades disposed at a uniform preselected angle with respect to the plane of the face of the body, the axis of the curved surface of said flute being disposed at a greater preselected uniform angle with respect to the plane of the face of said body toward the axis of said body than that of said cutting edges, said principal cutting edges of said blades serving to direct chips removed from a workpiece in a path substantially normal to said cutting edges of said blades and into pressure contact with said curved surfaces of said adjacent flutes, and the difference in the angular relationship between the said cutting edges of said blades and the said curved surfaces of said adjacent flutes serve to guide the chips into a helical path of travel away from the surface of the workpiece.

5. A rotary cutter for machine tools comprising a body, a blade receiving slot in said body, a cutter blade disposed in said slot having portions extending beyond the surfaces of said body, a chip flute disposed substantially parallel to and contiguous with said slot, said flute interrupting the surfaces of said body, and presenting a curved surface, said flute and adjacent slot being so positioned that a portion of said curved surface of said flute is disposed substantially in tangential relationship with the face of said cutter blade within said slot, a principal cutting edge on said blade disposed at a preselected angle with respect to the plane of the face of said body, the axis of the curved surface of said flute being disposed at a greater angle with respect to the plane of the face of said body toward the axis of said body than that of said cutting edge, said principal cutting edge of said blade serving to direct chips removed from a workpiece in a path substantially normal to said cutting edge of said blade and into pressure contact with said curved surface of said adjacent flute, and the difference in the angular relationship between the said cutting edge of said blade and the curved surface of said flute serve to guide the chips into a helical path of travel away from the surface of the workpiece.

6. A rotary cutter for machine tools comprising a cutter body having one or more cutter blade receiving slots, one side of which is defined by a front face of a back support for the cutter blade, one or more chip flutes in said cutter body associated with the blade slots, said chip flutes being constructed and arranged in a manner so that they extend upwardly and outwardly from the front face of said cutter body toward its back face through an entire section of said cutter body transverse to its front face to provide an uninterrupted guide surface for chips in a direct path from the workpiece toward the back face of said cutter body, each of said chip flutes having a curved surface which intersects one wall of the slot adjacent the chip flute and adjacent the marginal edge of said cutter body to form a sharp edge juncture with the wall of the slot so that said curved surface lies substantially tangent to the wall of said slot and extends therefrom to the back face of the back support of the preceding blade, the radius of said curved surface being not greater than one-half of the spacing between the front face of a blade and the back face of the back support of the preceding blade, and a cutter blade in the cutter blade receiving slot, the arrangement being such that a trace line of the principal cutting edge of a cutter blade and a trace line of the axis of an associated chip flute are two divergent lines which when projected into a plane which is perpendicular to the front face of said cutter body and contain the center line of the cutter and a point on the cutting edge on said blade will form an angle which opens upwardly and outwardly away from the front face of said cutter body, said principal cutting edge of said blade serving to direct chips removed from a workpiece in a path substantially normal to said cutting edge of said blade and into pressure contact with the curved surface of said adjacent flute, and the difference in the angular relationship between said cutting edge of said blade and the curved surface of said flute serves to guide the chips into a helical path of travel away from the surface of the workpiece.

7. A high speed rotary cutter for machine tools comprising a cutter body having a plurality of blade slots, a plurality of blades disposed in the slots, said blades being maintained within the slots by reason of an interference fit therebetween, a plurality of chip flutes in said cutter body associated with and substantially parallel to each of said blade slots, each of said chip flutes presenting a curved surface the axis of which extends upwardly from the face of said cutter body to provide an uninterrupted guide surface, said flutes being constructed and arranged in a manner so that the curved surface of the individual chip flutes intersect at the front bottom of the individual associated blade slots in said body, said chip flutes being in communication with the front face of said cutter body and extending upwardly therefrom toward its back face through an entire section of said cutter body transverse to its front face to provide an uninterrupted guide surface for chips in a direct path from a workpiece toward the back face of said cutter body, the edge formed by the wall of a slot and its intersection with the curved surface of an associated chip flute being feather-edged and contiguous with said blade so that a chip produced by said blade operating upon a workpiece will be directed against the curved surface of said chip flute from said blade and said flute will serve to guide the chips into a helical path of travel away from the surface of the workpiece.

References Cited in the file of this patent

UNITED STATES PATENTS

| | | |
|---|---|---|
| 1,276,081 | Kuhn | Aug. 20, 1918 |
| 1,854,672 | Robinson | Apr. 19, 1932 |
| 1,924,887 | Severson | Aug. 29, 1933 |
| 2,136,954 | Reaney | Nov. 15, 1938 |
| 2,186,417 | Kraus | Jan. 9, 1940 |
| 2,239,794 | Morse | Apr. 29, 1941 |
| 2,328,494 | Reaney | Aug. 31, 1943 |
| 2,538,909 | Miller | Jan. 23, 1951 |
| 2,761,196 | Graves | Sept. 4, 1956 |
| 2,805,469 | Greenleaf | Sept. 10, 1957 |